United States Patent
Mehta

(10) Patent No.: US 12,479,796 B2
(45) Date of Patent: Nov. 25, 2025

(54) MANUFACTURE OF CAROTENOID COMPOSITIONS

(71) Applicant: Unibar Corporation, Houston, TX (US)

(72) Inventor: Sevanti Mehta, Houston, TX (US)

(73) Assignee: UNIBAR CORPORATION, Houston, TX (US)

( * ) Notice: Subject to any disclaimer, the term of this patent is extended or adjusted under 35 U.S.C. 154(b) by 0 days.

(21) Appl. No.: 17/294,863

(22) PCT Filed: Nov. 22, 2019

(86) PCT No.: PCT/US2019/062748
§ 371 (c)(1),
(2) Date: May 18, 2021

(87) PCT Pub. No.: WO2020/112524
PCT Pub. Date: Jun. 4, 2020

(65) Prior Publication Data
US 2022/0009886 A1 Jan. 13, 2022

Related U.S. Application Data

(60) Provisional application No. 62/772,684, filed on Nov. 29, 2018.

(51) Int. Cl.
*C07C 403/24* (2006.01)
*A61K 36/81* (2006.01)
*C07C 403/16* (2006.01)

(52) U.S. Cl.
CPC .......... *C07C 403/24* (2013.01); *C07C 403/16* (2013.01); *A61K 36/81* (2013.01); *C07C 2601/08* (2017.05); *C07C 2601/16* (2017.05)

(58) Field of Classification Search
CPC . C07C 403/24; C07C 403/16; C07C 2601/16; A61K 31/122; A61K 36/81
See application file for complete search history.

(56) References Cited

U.S. PATENT DOCUMENTS

| | | | |
|---|---|---|---|
| 6,287,941 B1 * | 9/2001 | Kang | H01L 21/76254 438/459 |
| 7,572,468 B1 * | 8/2009 | Ishida | B01D 11/0288 424/725 |
| 2012/0321730 A1 * | 12/2012 | Jacob | A61K 36/81 424/760 |

FOREIGN PATENT DOCUMENTS

WO WO-02060865 A1 * 8/2002 ........... C07C 403/24

* cited by examiner

*Primary Examiner* — Sikarl A Witherspoon
(74) *Attorney, Agent, or Firm* — Tim D. Chheda

(57) ABSTRACT

A *Capsicum annum* extract composition (600) includes capsanthin in the range from 50% to 80%, zeaxanthin in the range from 5% to 15%, and cryptoxanthin the range from 1% to 5%.

9 Claims, 4 Drawing Sheets

MANUFACTURE OF CAROTENOID COMPOSITIONS

CROSS-REFERENCE TO RELATED APPLICATIONS

This application claims the benefit of U.S. Provisional Application No. 62/772,684, filed Nov. 29, 2018, and PCT App. No. PCT/US19/62748, filed Nov. 22, 2019, both applications titled "Manufacture of Carotenoid Compositions" and both applications by Sevanti Mehta.

SUMMARY

A *Capsicum annum* extract composition includes capsanthin in the range from 50% to 80%, zeaxanthin in the range from 5% to 15%, and cryptoxanthin in the range from 1% to 5%.

A method for manufacturing a composition includes extracting carotenoids from *Capsicum annum* fruits using a solvent or solvents, enriching the carotenoids using super critical fluid extraction, hydrolyzing the carotenoids, and purifying the carotenoids using counter current extractions.

A method for manufacturing a composition includes extracting carotenoids from *Capsicum annum* fruits using a solvent or solvents, enriching the carotenoids using super critical fluid extraction, hydrolyzing the carotenoids, and purifying the carotenoids using counter current extractions such that the composition includes capsanthin in the range from 50% to 80%, zeaxanthin the range from 5% to 15%, and cryptoxanthin in the range from 1% to 5%.

BRIEF DESCRIPTION OF THE DRAWINGS

Carotenoid compositions and methods of manufacture of carotenoid compositions are disclosed herein. In the drawings.

Figure 1:
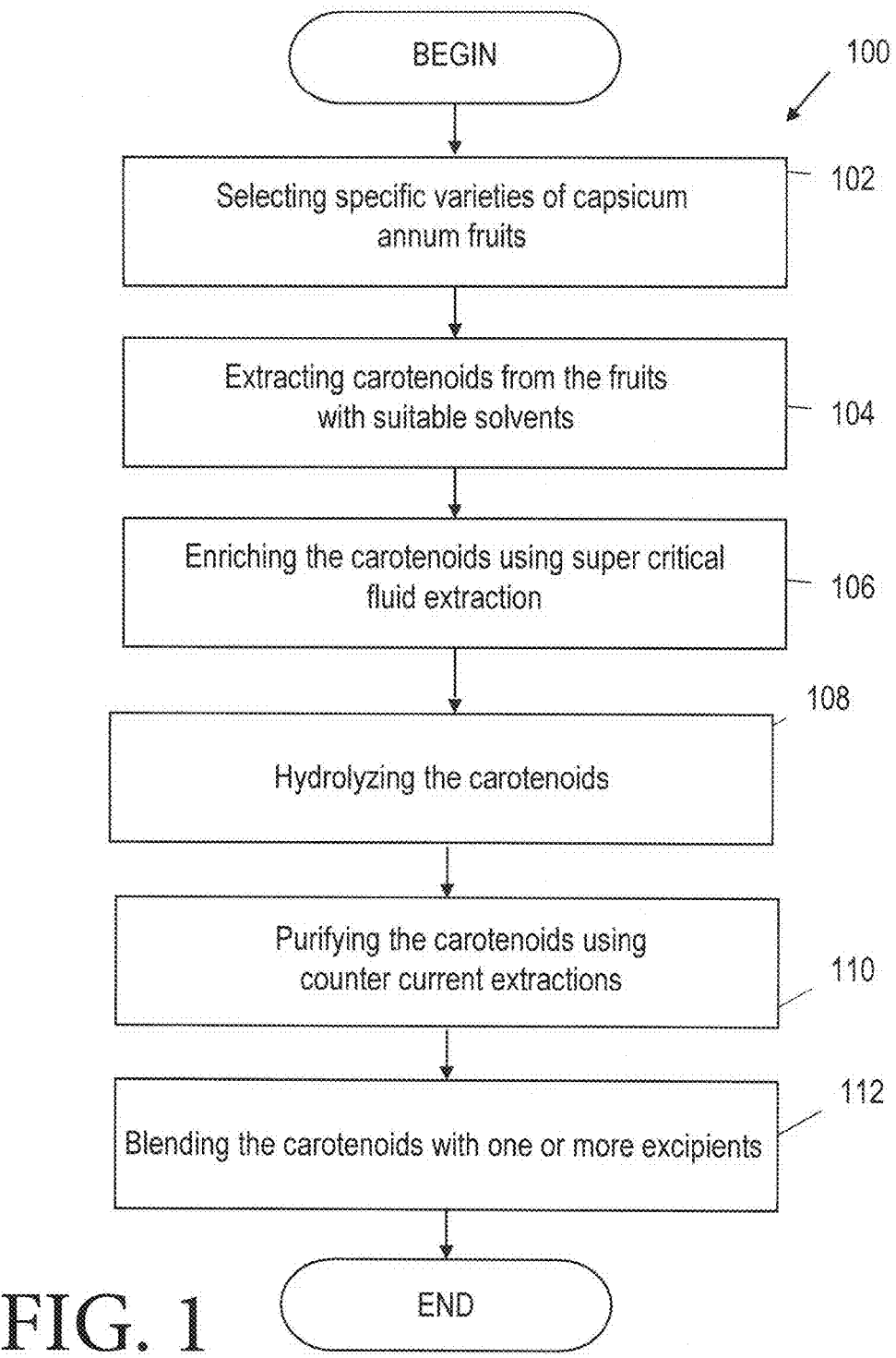
FIG. 1 depicts an illustrative method of manufacturing a carotenoid composition.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Carotenoids are any of various pigments such as carotenes found widely in plants and animals and characterized chemically by a long aliphatic polyene chain composed of eight isoprene units. Capsanthin is a carotenoid, as are beta-carotene, lycopene, lutein, and zeaxanthin. These pigments are found in red, orange, yellow, and green fruits and vegetables. Carotenoids are antioxidant tetraterpenoids, which aid disease-prevention mechanisms of the body.

Age-related macular degeneration ("AMD") is a common medical eye condition and a leading cause of vision loss among people over the age of fifty. It includes damage to the macula, an oval-shaped pigmented area near the center of the retina that is used for sharp, central vision. AMD may be of two types: dry (atrophic) or wet (exudative). In addition to aging, high blood-pressure, oxidative stress, blue light exposure, obesity, and the like may also cause AMD. The carotenoids in the macula help filter blue wavelengths of sunlight and reduce free radicals near the retina both of which are harmful to eye cells. Lutein and zeaxanthin are the carotenoids present in the retina, and they protect eye cells from photo oxidative damage. Specifically, chronic exposure to blue light, the major cause of AMD, causes reduction in cone density and cone sensitivity, and zeaxanthin may prevent AMD by absorbing blue light.

*Capsicums* are a widely consumed natural foodstuff used as a vegetable, spice, and/or color, and paprika extract is an extract of the fruits of the genus *Capsicum*. The genus, which originates from Central and Southern America, belongs to the solanaceae family and includes all peppers, from the mild bell pepper to the spicy habanero. There are five domesticated species of *Capsicum: annum, frutescens, chinense, pubescens*, and *baccatum*, and the most widely spread are *Annum, frutescens*, and *chinense*. The first to be introduced worldwide was *Annum*, originating from Mexico. It was previously divided into two categories: sweet (or mild) peppers and hot (or chili) peppers, though modern plant breeding removed that distinction. At present, *Annum* is the most wide-spread in terms of household consumption and industrial processing.

*Annum* is the varietal used to manufacture paprika extract for food coloration. Color extracts have a low content of capsaicin compared with the extracts used as spice agents. In the red varietal, capsanthin and capsorubin are the main compounds responsible for the red color. Pure carotenoid crystals derived from the *Annum* fruits include xanthophylls such as capsanthin, zeaxanthin, and cryptoxanthin. The chemical structure of the carotenoid ultimately determines what potential biological function(s) that pigment may have. The distinctive pattern of alternating single and double bonds in the polyene backbone of carotenoids is what allows them to absorb excess energy from other molecules, while the nature of the specific end groups on carotenoids may influence their polarity. The carbonyl group present in capsanthin and capsorubin makes them unique when compared to other carotenoids such as lutein and zeaxanthin.

FIG. 1 illustrates a method 100 of manufacturing a carotenoid composition in accordance with some illustrated embodiments. Specifically, disclosed herein are methods for isolating and purifying carotenoids containing a specific composition of carotenoids such as trans-capsanthin, trans-zeaxanthin, and beta-cryptoxanthin from *Capsicum annum* fruits leaving no trace of organic hazardous solvents. The method 100 includes selection of high colored composition of *Annum* chili varieties, solvent extraction, super critical fluid extraction ("SCFE") enrichment, alkali hydrolysis of carotenoid esters with absolute alcohol, purification using counter current extractor, concentration, and drying. The resulting crystals are suitable for dietary supplements, food additives, and the like for many purposes, discussed below, including but not limited to reduction of age related macular degeneration and blue light induced retinopathy.

At 102, specific varieties of *Capsicum annum* fruits are selected. In an embodiment, the *Capsicum annum* fruit is selected from the Bydagi chili varieties, or other chilies high in color value, alone or in combination such as: Bydagi-Kaddi, Bydagi-Dyavnoor, Bydagi-Dabbi, KDL, high color chili, 5531 high color chili, and/or 4431 high color chili. In an embodiment, the ratio of the combination is: (1) Bydagi-Kaddi:(1) Bydagi-Dyavnoor:(1) Bydagi-Dabbi (a ratio of 1:1:1). In other embodiments, unexpected results have been found using the ratio of 1:2:2 and 1:1:2 of Bydagi-Kaddi:Bydagi-Dyavnoor:Bydagi-Dabbi. Additionally, unexpected results have been found using the ratio of KDL high color, 5531 high color, and 4431 high color in 1:1:2, respectively. In various embodiments, the American Spice Trade Association ("ASTA") color value of the Bydagi chilies, or other high color chilies, are selected within the range from 2000 to 2600 units or a range from 2000 to 2400 units.

At 104, carotenoids are extracted from the fruits with suitable solvents. In an embodiment, dried, deseeded, and flaked *Capsicum annum* fruits undergo extraction using a solvent at a temperature ranging from 40° C. to 90° C., preferably at 60° C., for 4 hours to 8 hours, preferably 6 hours. The solvent extract is then concentrated under vacuum to produce *Capsicum* oleoresin containing carotenoids esters. In various embodiments, the extraction solvent may be one or a combination of: methanol, ethanol, and/or isopropyl alcohol.

For example, 250 kilograms of deseeded, flaked *Capsicum annum* fruits with ASTA color value from 2000 to 2400 units may be placed in a 2000 liter capacity reactor with an agitator. A volume of methanol (1000 L) may be added and the mixture may be stirred for 6 hours at 60° C. The methanol layer may be filtered and collected. This methanol extraction may be repeated three times for efficiency purposes.

At 106, the carotenoids are enriched using super critical fluid extraction. In an embodiment, carbon dioxide is used as a solvent, and the temperature for super critical fluid extraction ranges from 40° C. to 60° C., preferably 50° C. In an embodiment, the pressure employed for super critical fluid extraction ranges from 25 to 50 mPa, preferably 35 mPa.

Continuing the above example, all the methanol layers may be combined and concentrated under vacuum. 22 kg of oleoresin may be obtained and formulated with approximately 110 kg of calcium carbonate in super critical fluid extractor bags. The extractor bags may be placed in an extraction chamber and extracted at 50° C. and 35 mPa. The yield of enriched oleoresin may be approximately 11 kg.

At 108, the carotenoid esters are hydrolyzed. In an embodiment, the enriched oleoresin is hydrolyzed with alcoholic potassium hydroxide to produce free carotenoids. In an embodiment, the base for hydroxylation is selected from a group consisting of potassium hydroxide (KOH), sodium hydroxide (NaOH), or a combination thereof. In an embodiment, the solvent media for hydrolysis is methanol, ethanol, isopropyl alcohol, or a combination thereof. In an embodiment, concentration of the hydrolysis agent ranges from 10% to 30%. In an embodiment, the temperature of hydrolysis ranges from 70° to 85° C., preferably 80° C. In an embodiment, the time required for hydrolysis ranges from 1 hour to 3 hours, preferably 2 hours. As the carotenoids are hydrolyzed to free form, they become more bioavailable.

Continuing the above example, the enriched oleoresin may be placed in a 500 L glass lined reactor. In a separate vessel, 5 kg of Potassium hydroxide may be added to 40 L of ethyl alcohol while stirred. The alcoholic KOH may be added to the enriched oleoresin slowly while stirred at 80° C. for two hours.

At 110, the hydrolyzed carotenoids are purified using counter current extractions. In an embodiment, the solvent used for counter current extraction is ethyl acetate, isopropyl acetate, or a combination thereof. In an embodiment, the immiscible aqueous phase is water or water acidified with hydrochloric acid (pH 3-4), preferably acidified water.

Continuing the above example, after ensuring the degree of saponification to be more than 99% by HPLC, 40 liters of demineralized hot water maintained at a temperature of 70° C. may be added to the reacted mass while stirred for 10 minutes. The diluted mass with carotenoid crystals may be pumped into a filter press to recover the crystals. Around 250 liters of additional hot water may be pumped through the filter press to wash the unwanted impurities and bring down the pH of the effluent to neutral around 7.0. After ensuring the neutralization, a positive pressure of nitrogen may be applied to the filter press to squeeze the crystals trapped inside the filter. The wet crystals with an approximate weight 6.7 kg may then be collected from the filter press, dissolved in 60 L of ethyl acetate, and charged into a counter current extractor. 100 L of water may be used, and the pH may be adjusted to 3 or 4 with dil-HCl. The acidified water may be bottom fed into the counter current extractor.

At 112, the *Capsicum annum* extract is blended with excipient(s). In various embodiments, the excipient is sunflower oil, safflower oil, soy lecithin, sunflower lecithin, phosphatidylcholine from sunflower or soy, starch, dextrin, lactose, dicalcium phosphate, colloidal silicon dioxide, and/or combinations thereof. In other embodiments, the excipient is a granulating agent, binding agent, lubricating agent, disintegrating agent, sweetening agent, glidant, anti-adherent, anti-static agent, surfactant, anti-oxidant, gum, coating agent, coloring agent, flavoring agent, coating agent, plasticizer, preservative, suspending agent, emulsifying agent, plant cellulosic material, spheronization agent, and/or combinations thereof. In an embodiment, the carotenoids are further isolated and/or purified by: addition of one or more solvents, addition of ionic resin, quenching, filtration, extraction, and/or ion exchange resin.

Continuing, the example above, the ethyl acetate layer may be removed, dried over anhydrous sodium sulphate, and concentrated. The yield of composition may be about 1.1 kg. The carotenoid contents as measured by a spectrophotometer may be about 95.34%, with all trans-capsanthin, all trans-zeaxanthin, and all the beta-cryptoxanthin by HPLC at 98.71%, 8.31% and 2.63% respectively. The final product may contain a moisture content of about 0.2% with no traces of residual methanol and ethyl acetate detected by gas chromatography analysis.

As a result of the above process, in an embodiment the composition of carotenoids ranges from capsanthin: 50% to 80%, zeaxanthin: 5% to 15%, cryptoxanthin: 1% to 5%, and trace is amounts of other carotenoids. These percentages, and all percentages herein, refer both to actual percentages and percentages allowable by labeling regulations. In an embodiment, the composition of total carotenoids ranges from 90% to 99%. In another embodiment, the composition may include total carotenoids in the range from 10% to 99%. In an embodiment, the carotenoids are trans-capsanthin: (3R,3'S,5'R)-3,3'dihydroxy-$\beta$,$\kappa$-caroten-6'-one; trans-zeaxanthin: 3R,3'R-$\beta$,$\beta$-carotene-3,3'-diol; and beta-cryptoxanthin; (3R,6'R)-4',5'-didehydro-5',6'-dihydro-$\beta$,$\beta$-caroten-3-ol. In an embodiment, the color value of carotenoids ranges from 800,000 to 1,250,000. Accordingly, the composition is ideal to provide color to cosmetics such as lipstick, chapstick, liquid gloss, lipstick paste, blush, lip liner, foundation, concealer, eye contourer, eyeliner, mascara, nail polish, eye shadow, body make-up, and the like.

In various embodiments, the *Capsicum annum* extract including capsanthin, zeaxanthin, and cryptoxanthin described above is used for the management of age related macular degeneration conditions including blurred vision, distorted vision, reduced central vision, difficulty in adopting low light levels, and/or combinations thereof. Also, the composition protects against blue light induced retinopathy via decreasing oxidative and endoplasmic reticulum stress and provides functional and morphological preservation of photoreceptors against blue light damage. Finally, the composition lowers the intraocular pressure associated with normal tension glaucoma, primary open angle glaucoma, angle closure glaucoma, and/or combinations thereof in various embodiments as shown in FIG. 2.

Figure 2:
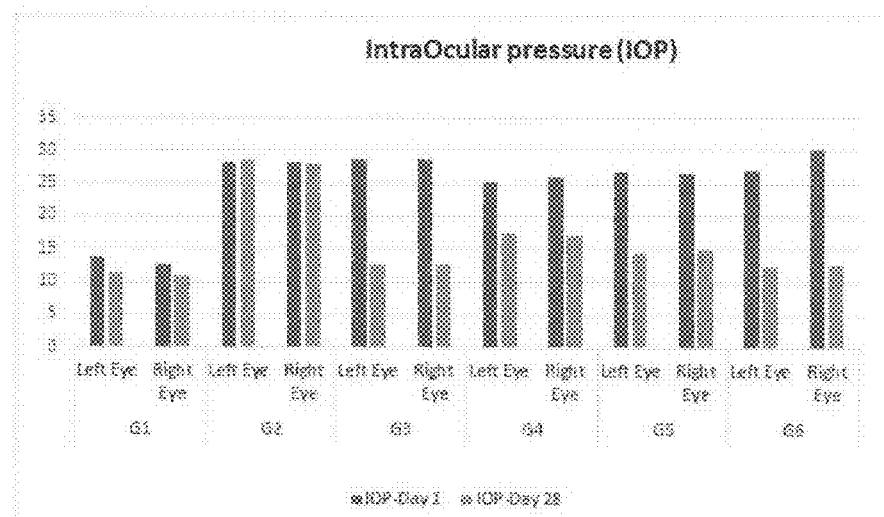
FIGS. 2-5 depict illustrative results of the performance of the carotenoid composition.

FIG. 2 depicts the results of a study to evaluate lowering of intraocular pressure ("IOP") in animals. The high intraocular pressure originated from an increased resistance to drainage of aqueous humor through the trabecular meshwork. A sustained increase in aqueous humor may be due to an increase in the formation of aqueous humor, a difficulty in its exits, or a raised pressure in the episcleral vein. In this study, IOP was induced by intravitreal injection. FIG. 2 shows a bar chart depicting six groups (G1-G6), and the left eye and right eye IOP for each group. The first two groups (G1-G2) are control groups in which no IOP lowering composition was introduced. In G1, IOP was not induced, and in G2, IOP was induced. For the next for groups (G3-G6), the left bar for each eye represents IOP prior to introduction of the composition disclosed herein in one embodiment. The right bar for each eye represents IOP after introduction of the composition. The results show that introduction of the composition reduced IOP to a level almost equal to the group in which IOP was not induced (G1), and significantly lower than the group in which the composition was not introduced (G2).

Figure 3:
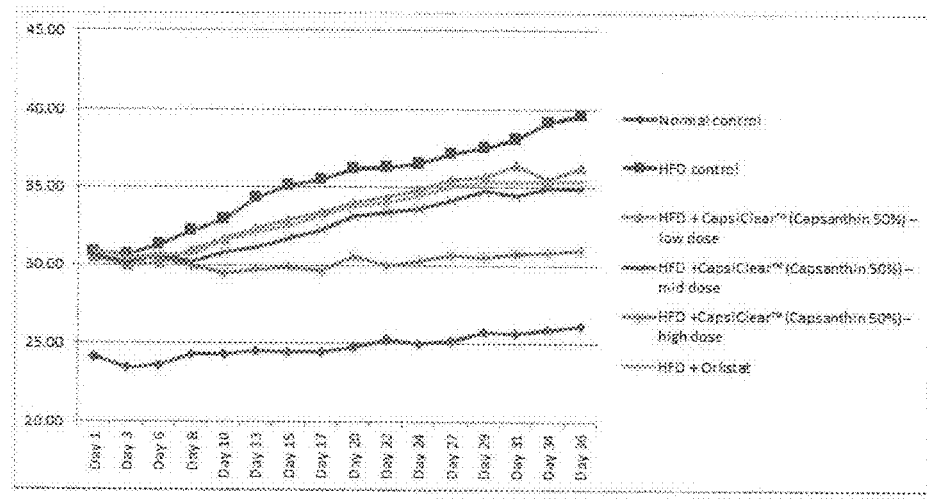
Figure 4:
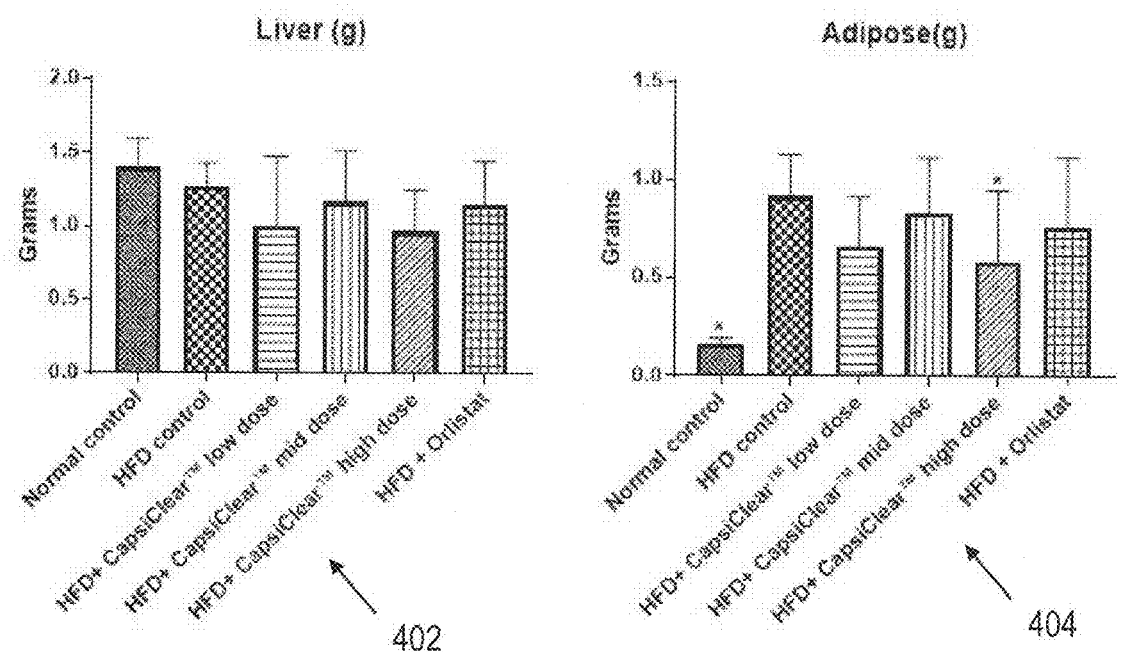
Figure 4:
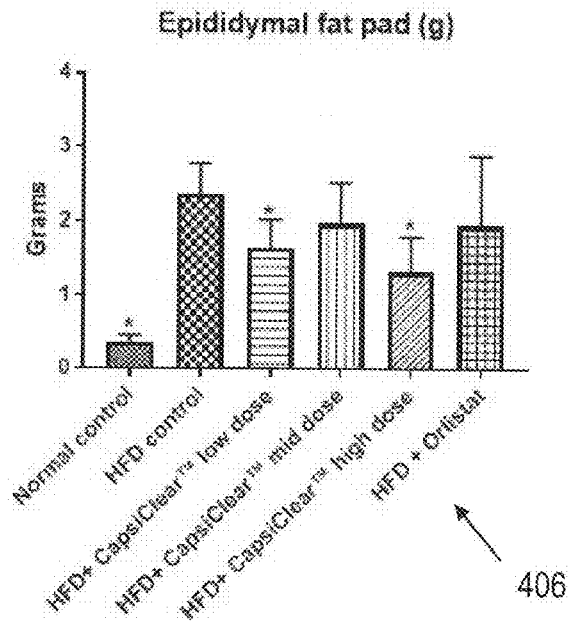
Figure 5:
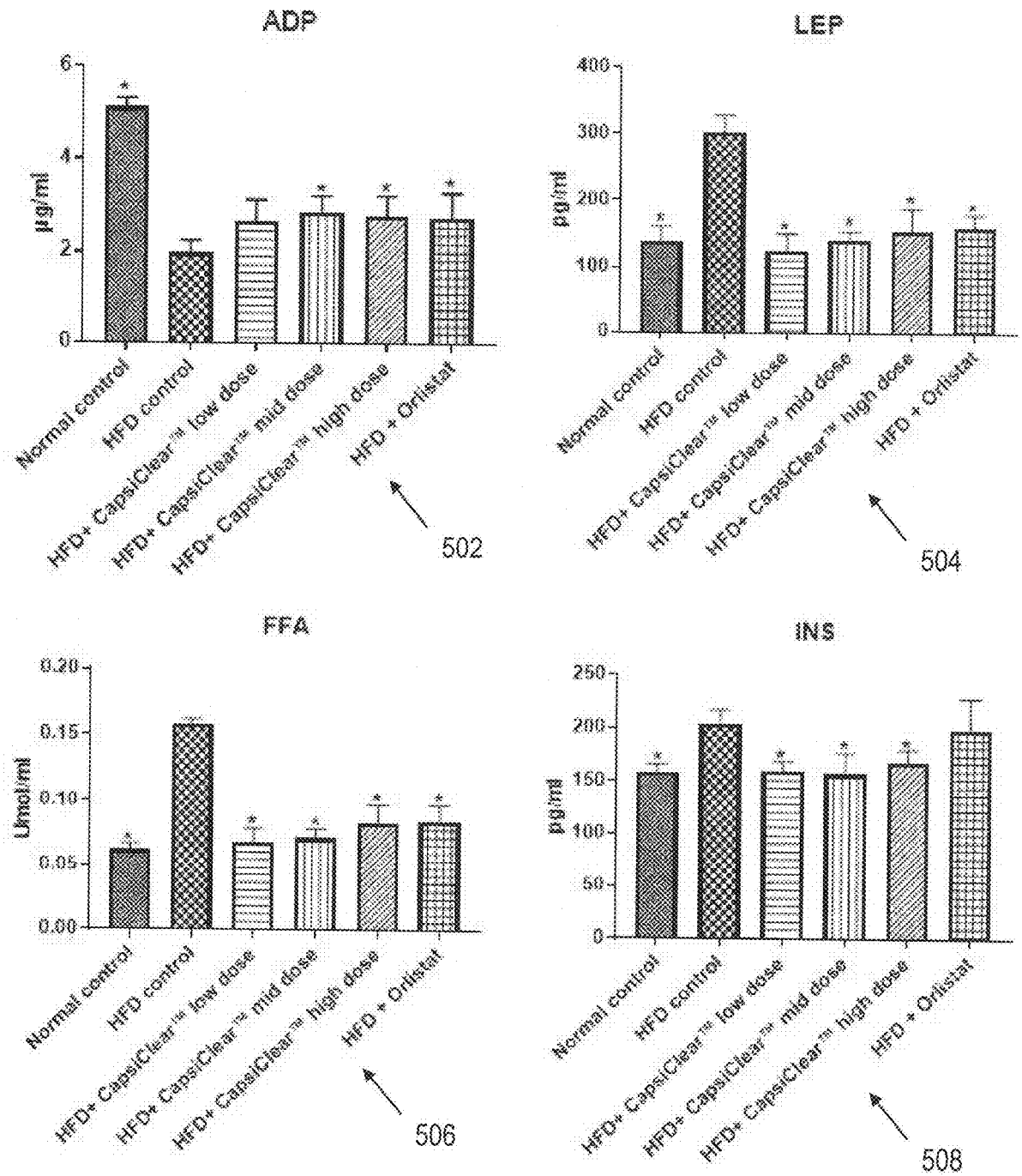

FIGS. 3 to 5 depict the results of a study to evaluate anti-obesity effect of the composition disclosed herein, referred to in the Figures as CapsiClear, "HFD" refers to a high-fat diet used to induce obesity. Six groups were used in this study: G1-G6. G1 refers to the group given a normal diet, G2 refers to the group given a high-fat diet, G3 refers to the group given a high-fat diet with a low dose of the composition, G4 refers to the group given a high-fat diet with a medium dose of the composition, G5 refers to the group given a high-fat diet with a high dose of the composition, and G6 refers to the group given a high-fat diet with a reference drug Orlistat. In FIG. 3, the y-axis depicts body weight while the x-axis depicts time in days. As can be seen, a significant reduction in body weight of 31% was observed at the high dose of 80 mg/kg. FIG. 4 includes three charts 402, 404, 406 showing the results of different measurements in the study. At 402, liver mass was decreased in groups given the composition. At 404, adipose tissue weight was significantly reduced in the group given high doses of the composition. At 406, epididymal fat pad weight was significantly reduced in the group low and high doses of the composition. FIG. 5 includes four charts 502, 504, 506, 508 showing the results of different measurements in the study. At 502, adiponectin was significantly increased in the groups given medium and high doses of the composition. The increase in adiponectin causes a decrease in insulin-resistance and body weight. At 504, 506, and 508, plasma leptin, plasma free fatty acid, and insulin respectively were significantly reduced in all groups given the composition. The lowering of insulin causes the lowering of body weight, the lowering of plasma free fatty acid causes improved mitochondrial function and whole-body insulin sensitivity, and the lowering of plasma leptin causes restoration of hypothalamic leptin sensitivity, reduction in weight gain, and enhancement of insulin sensitivity. Accordingly, based on all of the above, the composition may be used effectively for weight loss purposes as well along or in combination with other benefits.

Figure 6:
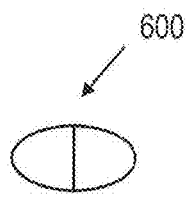
FIG. 6 depicts an illustrative embodiment of manufacture of the carotenoid composition.

FIG. 6 illustrates a composition 600 of the *Capsicum annum* extract including to capsanthin, zeaxanthin, and cryptoxanthin manufactured as described above in a capsule embodiment for pharmaceutical, nutraceutical, and/or cosmeceutical purposes. In other embodiments the composition is implemented as a tablet, injectable, cream, gel, ointment, lotion, solution, beverage, confection, emulsion, foam, troche, lozenge, aqueous suspension, oily suspension, patch, dentifrice, spray, drop, powder, granule, syrup, elixir, food stuff, and/or combinations thereof. In preferred embodiments, the composition includes a tablet, soft gelatin capsule, hard gelatin capsule, cream, gel, lotion, and/or combinations thereof.

In an embodiment, the composition may be administered by topical administration, oral administration, intravenous administration, intra articular administration, intramuscular administration, and/or combinations thereof in various embodiments. In preferred embodiments, the mode of administration is oral, topical, intravenous intramuscular, and/or combinations thereof. In addition, materials such as flaxseed, flaxseed oil, vegetarian or vegetable oil, and other oils may be combined with the composition to stabilize the active ingredients. Regardless of the amount of materials combined with the composition, the percentages of carotenoids in relation to the total amount of carotenoids remains the same in at least some embodiments.

A 12-week, randomized, placebo-controlled, pilot clinical study indicates that the composition may: increase macular pigment density (MPOD), which is linked to better visual performance, reduce recovery time after exposure to bright light, and improve reading under different light conditions (both white and blue light) in addition to the benefits already described.

Additional embodiments and features of the present disclosure will be apparent to one of ordinary skill in art based upon description provided herein. The embodiments herein and various features and advantageous details thereof are explained with reference to the non-limiting embodiments in the description. The examples used herein are intended merely to facilitate an understanding of ways in which the embodiments herein may be practiced and to further enable those of skill in the art to practice the embodiments herein. Accordingly, the following examples should not be construed as limiting the scope of the embodiments herein.

In some aspects, apparatuses, systems, and methods for multiple games are provided according to one or more of the following examples:

Example 1: A *Capsicum annum* extract composition includes capsanthin in the range from 50% to 80%, zeaxanthin in the range from 5% to 15%, and cryptoxanthin in the range from 1% to 5%.

Example 2: A method for manufacturing a composition includes extracting carotenoids from *Capsicum annum* fruits using a solvent or solvents, enriching the carotenoids using super critical fluid extraction, hydrolyzing the carotenoids, and purifying the carotenoids using counter current extractions.

Example 3: A method for manufacturing a composition includes extracting carotenoids from *Capsicum annum* fruits using a solvent or solvents, enriching, the carotenoids using super critical fluid extraction, hydrolyzing the carotenoids, and purifying the carotenoids using counter current extractions such that the composition includes capsanthin in the range from 50% to 80%, zeaxanthin in the range from 5% to 15%, and cryptoxanthin in the range from 1% to 5%.

The following features may be incorporated into the various embodiments described above, such features incorporated either individually in or conjunction with one or more of the other features:

The capsanthin may include trans-capsanthin (3R,3'S, 5'R)-3,3'-dihydroxy-β,κ-caroten-6'-one), the zeaxanthin may include trans-zeaxanthin (3R, 3'R-β,β-carotene-3,3'-diol), and the cryptoxanthin may include beta-cryptoxanthin (3R,6'R)-4',5'-Didehydro-5',6'-dihydro-β,β-caroten-3-ol.

The color value of carotenoids may range from 800,000 to 1,250,000. The composition may aid in the management of age related macular degeneration conditions such as blurred vision, distorted vision, reduced central vision, and difficulty in adopting low light levels. The composition may protect against blue light induced retinopathy via decreasing oxidative and endoplasmic reticulum stress. The composition may provide color for a cosmetic such as lipstick, chapstick, liquid gloss, lipstick paste, blush, lip liner, foundation, concealer, eye contourer, eyeliner, mascara, nail polish, eye shadow, or body make-up. The composition may provide functional and morphological preservation of photoreceptors against blue light damage. The composition may lower the intraocular pressure associated with tension glaucoma, primary open angle glaucoma, and angle closure glaucoma. The composition may lower body weight. The composition may lower insulin thereby lowering body weight. The composition may lower plasma free fatty acid thereby improving mitochondrial function and whole-body insulin sensitivity. The composition may lower plasma leptin thereby restoring hypothalamic leptin sensitivity, reducing weight gain, and enhancing insulin sensitivity. The composition may increase adiponectin thereby decreasing insulin-resistance and body weight. The composition may decrease adipose tissue weight and epididymal fat pad. The composition may be in a form such as a capsule, tablet, injectable, cream, gel, ointment, lotion, solution, beverage, confectionery, emulsion, foam, troche, lozenge, aqueous suspension, oily suspension, patch, dentifrice, spray, drop, powder, granule, syrup, elixir, or food stuff. The composition may include total carotenoids in the range from 10% to 99%. The *Capsicum annum* fruits may be the KDI, high color, 5531 high color, and 4431 high color in a 1:1:2 ratio, respectively. The ASTA color value of the *Capsicum annum* fruits may range from 2000 to 2600 units. The solvents may include ethanol, methanol, and isopropyl alcohol. Extracting the carotenoids may include extracting the carotenoids at a temperature ranging from 40° C. to 90° C. for a time period ranging from 4 hours to 8 hours. The solvent media for super critical fluid extraction may be carbon dioxide. Enriching the carotenoids may include enriching the carotenoids using super critical fluid extraction at a temperature ranging from 40° C. to 60° C. Enriching the carotenoids may include enriching the carotenoids using super critical fluid extraction at a pressure ranging from 25 mPa to 50 mPa. Hydrolyzing the carotenoids may include hydrolyzing the carotenoids using KOH and NaOH. Hydrolyzing the carotenoids may include hydrolyzing the carotenoids using Methanol, Ethanol, and Isopropyl alcohol. Hydrolyzing the carotenoids may include hydrolyzing the carotenoids using a hydrolysis agent within the range of 10% to 30%. Hydrolyzing the carotenoids may include hydrolyzing the carotenoids at a temperature within the range of 70° C. to 85° C. Hydrolyzing the carotenoids may include hydrolyzing the carotenoids within the range of 1 hour to 3 hours. Purifying the carotenoids may include purifying the carotenoids using a solvent for counter current extraction comprising ethyl acetate and isopropyl acetate. An immiscible aqueous phase may be used for counter current extraction water and water acidified with hydrochloric acid (pH 3-4). The methods may further include blending the carotenoids with an excipient such as sunflower oil, safflower oil, soy lecithin, sunflower lecithin, phosphatidylcholine from sunflower or soy, starch, dextrin, lactose, dicalcium phosphate, or colloidal silicon dioxide.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein. Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A process, for the treatment or lowering of excess intraocular pressure, comprising:
   extracting carotenoids from capsicum annum fruits using a solvent or solvents;
   enriching the carotenoids using super critical fluid extraction;
   hydrolyzing the carotenoids;
   purifying the carotenoids using counter current extractions; and
   supplying the carotenoids for a subject to increase fluid outflow thereby treating or lowering symptomatic intraocular pressure associated with normal tension glaucoma, primary open angle glaucoma, or angle closure glaucoma.

2. The process of claim 1, wherein extracting the carotenoids comprises extracting the carotenoids at a temperature ranging from 40° C. to 90° C. for a time period ranging from 4 hours to 8 hours.

3. The process of claim 1, wherein enriching the carotenoids comprises enriching the carotenoids using super critical fluid extraction at a temperature ranging from 40° C. to 60° C.

4. The process of claim 1, wherein enriching the carotenoids comprises enriching the carotenoids using super critical fluid extraction at a pressure ranging from 25 mPa to 50 mPa.

5. A process for the treatment of excess intraocular pressure comprising:
   extracting carotenoids from capsicum annum fruits using a solvent or solvents;

enriching the carotenoids using super critical fluid extraction;

hydrolyzing the carotenoids; and purifying the carotenoids using counter current extractions such that the composition includes capsanthin in the range from 50% to 80%, zeaxanthin in the range from 5% to 15%, and cryptoxanthin in the range from 1% to 5%;

supplying the carotenoids for a subject to increase fluid outflow and thereby lowering symptomatic intraocular pressure associated with normal tension glaucoma, primary open angle glaucoma, or angle closure glaucoma in the subject.

6. A process for lowering intraocular pressure comprising:

supplying for a subject an effective amount of a *Capsicum annum* extract composition comprising:

capsanthin in the range from 50% to 80%;

zeaxanthin in the range from 5% to 15%; and cryptoxanthin in the range from 1% to 5%, wherein the *Capsicum annum* extract composition is produced by a process comprising:

at least one step of extracting carotenoids from *Capsicum annum* fruits using an organic extraction solvent; and at least one step of enriching the extracted carotenoids by extraction with supercritical carbon dioxide;

wherein the effective amount is effective to reduce intraocular pressure in a subject.

7. The process of claim 6, wherein the process of producing the *Capsicum annum* extract composition further comprises:

a step of hydrolyzing the enriched carotenoids; and a step of purifying the hydrolyzed carotenoids to obtain the *Capsicum annum* extract composition comprising capsanthin in the range from 50% to 80%.

8. The process of claim 6, wherein the process of producing the *Capsicum annum* extract composition consists of:

said at least one step of extracting carotenoids from *Capsicum annum* fruits using the organic extraction solvent;

said at least one step of enriching the extracted carotenoids by extraction with supercritical carbon dioxide; and optionally hydrolyzing and purifying the enriched carotenoids.

9. A process comprising:

supplying for a subject an effective amount of a *Capsicum annum* extract comprising:

capsanthin in the range from 50% to 80%;

zeaxanthin in the range from 5% to 15%; and cryptoxanthin in the range from 1% to 5%;

along with at least one excipient;

wherein the effective amount is effective to reduce intraocular pressure in the subject.

* * * * *